United States Patent Office 3,730,932
Patented May 1, 1973

3,730,932
SELF-BONDING, HEAT-CURABLE SILICONE
RUBBER
George P. De Zuba, Waterford, and Abe Berger and
Terry G. Selin, Schenectady, N.Y., assignors to General
Electric Company
No Drawing. Filed May 17, 1971, Ser. No. 144,249
Int. Cl. C08g 51/04, 51/50
U.S. Cl. 260—29.1 SB        16 Claims

ABSTRACT OF THE DISCLOSURE

Self-bonding, heat-curable silicon rubber composition comprising (a) a diorganopolysiloxane polymer (b) a curing catalyst and (c) a compound of the formula, $$R^6-C-Z-R^5$$
$$\parallel$$
$$R^6-C-Z-G^1$$

where $R_6$ is selected from alkyl radicals and hydrogen, Z is selected from COO, phenylene, CO, CONH and CON—$R^2$, $R^2$ is selected from monovalent hydrocarbon radicals and halogenated monovalent hydrocarbon radicals, $R^5$ is selected from unsaturated monovalent hydrocarbon radicals and unsaturated halogenated monovalent hydrocarbon radicals, $G^1$ is selected from hydrogen, $R^2$ radicals and $R^5$ radicals. There may also be used in the above composition a process aid, a filler and other ingredients commonly used in heat-curable silicone rubber compositions. In place of the maleate set forth above, and/or in addition to the maleate set forth above, there may be used a silylmaleate.

BACKGROUND OF THE INVENTION

The present invention relates to heat-curable silicone rubber compositions and, in particular, relates to heat-curable silicone rubber compositions which are self-bonding to various substrates, such as plastics, metals or glass.

Heat-curable silicone rubber is applied to various substrates for various purposes. It may, for instance, be applied to various synthetic fiber substrates, such as dacron or nylon, which imparts enhanced physical properties to the resulting laminate so that the laminate can be used for such purposes as gaskets, radiator hoses and the like. Further, for various reasons, it is desirable to apply heat-curable rubber to various hard substrates, such as metals or glass, so as to impart improved weatherability to the resulting laminated product.

At the present time, when heat-curable rubber is applied to various substrates, it is necessary to employ a primer, that is, a primer is applied on the surface of the substrate and then the silicone rubber composition is applied thereover and cured onto the substrate. If the silicone rubber composition is applied to he substrate without a primer, then in many cases the bond between the silicone rubber and the substrate is not as strong as would be desired. In discussing bonds, it is necessary to distinguish between two types of failure that may occur in the bonding between a silicone rubber layer and a substrate, that is cohesive failure and adhesive failure. Insofar as it relates to this application, adhesive failure occurs when the silicone rubber layer separates from the substrate at the point wherein the two layers meet, that is the bond between the silicone rubber layer and the substrate ruptures before the silicone rubber layer or the substrate. Cohesive failure occurs when the silicone rubber layer or the substrate rupture before the bond between the silicone rubber layer and the substrate fails.

In order to obtain cohesive failure with the present silicone rubber materials, it is necessary in many cases to use a primer before the application of the silicone rubber layer to the substrate. However, the use of a primer entails an additional step in the preparation of the laminate and thus is costly, as well as time consuming.

Further, there are presently only a limited number of primers that can be used with silicone rubber materials. Further, when some of these primers are used, they produce results of adhesive failure rather than cohesive failure when the laminate is tested. In addition, with these primers that are known, it is not always possible to obtain cohesive failure in the laminate when the silicone rubber is applied to certain substrates. In the copending docket of DeZuba, Berger and Selin, Ser. No. 132,552, filed Apr. 8, 1972, now abandoned, there is disclosed one type of In the present case, there is disclosed another type of self-bonding, heat curable silicone ruber composition bonding, heat-curable silicone rubber composition.

Accordingly, it is one object of the present invention to provide a heat-curable silicone rubber composition that is self-bonding to all types of substrates.

It is another object of the present invention to provide a heat-curable silicone rubber composition that is self-bonding to various substrates and has good physical properties.

It is yet another object of the present invention to provide a heat-curable silicone rubber composition that will self-bond to various substrates and results in cohesive failure when tension is applied to separate the rubber composition from the substrate.

It is an additional object of the present invention to provide a process for producing a heat-curable silicone rubber composition that is self-bonding to all types of substrates and which can be used and applied immediately to any substrate without the use of a primer.

These and other objects of the present invention are accomplished by means of the composition and process set forth below.

SUMMARY OF THE INVENTION

There is provided by the present invention a self-bonding, heat-curable silicone rubber composition comprising an organopolysiloxane polymer having a viscosity of at least 100,000 centistokes at 25° C. of the formula, (1) $$(R)_a SiO_{\frac{4-a}{2}}$$

a curing catalyst and a compound of the formula, (2) $$R^6-C-Z-R^5$$
$$\parallel$$
$$R^6-C-Z-G'$$

or a compound of the formula, (3) $$R^6-C-Z-R^5$$
$$\mid$$
$$G'-Z-C-R^6$$

where R is selected from monovalent hydrocarbon radicals and halogenated monovalent hydrocarbon radicals, $R^6$ is selected from alkyl radicals of up to 10 carbon atoms and hydrogen, Z is selected from COO, phenylene, CO, CONH and CONR², $R^2$ is selected from the same radicals as R, $R^5$ is selected from unsaturated monovalent hydrocarbon radicals and unsaturated halogenated monovalent hydrocarbon radicals, G' is selected from hydrogen, R radicals and $R^5$ radicals and a varies from 1.95 to 2.0, inclusive. In the above composition, there is present 82% to 99.65% by weight of the organopolysiloxane, 0.1 to 8% by weight of the curing catalyst and 0.25% to 10% by weight of the maleate or fumarate based on the weight of the composition. There usually is in the above composition a process aid which comprises 1% to 25% by weight of the organopolysiloxane. There may also be present a filler which is usually a silica filler, which can comprise 20 to 60% by weight of the organopolysiloxane. In addition, there of course can be any of the other ingredients and additives normally to be found in heat-curable silicone rubber compositions.

In place of the maleates and fumarates set forth above, or in addition to the maleates of Formulas 2 and 3, there may be present in the composition silyl compounds selected from the group consisting of the formula, (4) 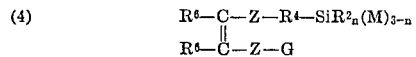

and of the formula, (5) 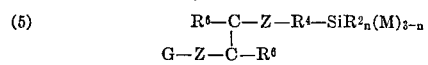

where Z is selected from COO, phenylene, CO, CONH, and $CONR^2$, G is selected from hydrogen, R' and $R^4SiR_n^2(M)_{3-n}$, M is selected from $R^3O$ and $R^3COO$, where R, $R^2$ and $R^3$ are seelcted from monovalent hydrocarbon radicals and halogenated monovalent hydrocarbon radicals, $R^6$ is selected from alkyl radicals of up to 10 carbon atoms and hydrogen, $R^4$ is selected from divalent hydrocarbon radicals and halogenated divalent hydrocarbon radicals, R' is selected from monovalent hydrocarbon radicals and halogenated monovalent hydrocarbon radicals and is preferably an unsaturated monovalent hydrocarbon radical such as alkenyl, and $n$ is a whole number that varies from 1 to 3.

BRIEF DESCRIPTION OF THE PREFERRED EMBODIMENT

In the above formulas, that is, Formulas 1 through 5, the radicals R, $R^2$ and $R^3$ may be aryl radicals and halogenated aryl radicals such as phenyl, chlorophenyl, xylyl, tolyl, etc.; aralkyl radicals, such as phenethyl, benzyl, etc.; aliphatic, haloaliphatic and cycloaliphatic radicals such as alkyl, alkenyl, cycloalkyl, haloalkyl, including methy, ethyl, propyl, chlorobutyl, cyclohexyl, etc.; cyanoakyl radicals such as cyanoethyl, cyanopropyl, cyanobutyl, etc. Preferably, the R radical is represented by methyl and phenyl radicals, where more than 50% of the R radicals are methyl. Further, in the organopolysiloxane polymer represented by Formula 1, there is preferably 0.1 to 0.6 weight percent of the polymer of vinyl radicals. Further, preferably the $R^2$ and $R^3$ radicals are alkyl radicals of not more than 8 carbon atoms and are preferably methyl or ethyl. The $R^6$ radical is selected from hydrogen and alkyl radicals of up to 10 carbon atoms. Preferably, the $R^6$ radical is hydrogen. Radicals represented by $R^5$ are alkenyl radicals, cycloalkenyl radicals and arylalkenyl radicals, such as vinyl, allyl, cyclohexyl, phenyl-2-propenyl, etc. In addition, the $R^5$ radicals may be represented by alkynyl radicals, such as propargyl, etc. It is preferred that $R^5$ be either vinyl or allyl or an alkenyl radical of less than 8 carbon atoms. The R' radical in Formulas 4 and 5 may be a saturated monovalent hydrocarbon radical or an unsaturated monovalent hydrocarbon radical and is preferably represented by the radicals recited in the exemplification of the R, $R^2$ and $R^3$ radicals. However, more preferably, the R' radical is selected from unsaturated monovalent hydrocarbon radicals and halogenated unsaturated monovalent hydrocarbon radicals such as alkenyl radicals of up to 8 carbon atoms. It is preferred that G' be an $R^5$ radical, that is, an unsaturated monovalent hydrocarbon radical. In Formulas 4 and 5, it is preferable that G be an R' radical such as an unsaturated monovalent hydrocarbon radical exemplified by alkenyl radicals of up to 8 carbon atoms. In Formulas 2 to 5, it is preferable that Z be equivalent to a carboxyl radical, since when Z is equal to the other radicals enumerated above, these compounds are more difficult to synthesize. In Formulas 2 through 5, both the cis and trans isomers have been shown and are intended to be covered. Any of the isomers of the maleates and the silylmaleates disclosed in the use of or mixtures of the isomers may be used. In addition, there may be used the maleates and silylmaleates alone or a mixture of the maleates and silylmaleates. Radicals included by $R^4$ are divalent saturated and unsaturated hydrocarbon radicals such as alkenyl, alkenylene, alkynylene and arylene radicals, which are exemplified by ethylene, trimethylene, tetramethylene, phenylene, ethylene-phenylene, etc. The radical $R^4$ may have 2 to 20 carbon atoms, and is preferably ethylene.

Maleates coming within the scope of Formulas 2 and 3 are diallylmaleates, dipropenylmaleate, dibutenylmaleate, etc. The preferred silylmaleate coming within the scope of Formulas 4 and 5 is bis-trimethoxysilylpropylmaleate and bis-trimethoxysilylbutylmaleate. Other compounds coming within the scope of Formulas 2 through 5 which are the preferred compounds in the present case and exemplify the compounds intended to be covered within the scope of Formulas 2 through 5 are as follows:

bis-trimethoxysilylpropylmaleate
diallylfumarate
allyl acid maleate
bis-(3-chloropropenyl)maleate
ethyl allyl fumarate
disopropenyl fumarate
bis-trimethoxysilylpropyl fumarate
bis-dimethoxymethylsilylpropyl maleate
trimethoxysilylpropyl allyl fumarate
bis-ethoxydimethylsilylpropenyl maleate There are also within the scope of Formula 1 polydiorganosiloxanes which can be copolymers containng two or more different diorganosiloxane units therein and copolymers of dimethylsiloxane units and methylphenylsiloxane units; or copolymers of methylphenylsiloxane units, diphenylsiloxane units, dimethylsiloxane units and methylvinylsiloxane units, a swell as copolymers of dimethylsiloxane units, methylvinylsiloxane units and diphenylsiloxane units.

Preparation of the diorganopolysiloxane of Formula 1 which can contain both saturated and olefinically unsaturated hydrocarbon groups may be carried out by any of the procedures well known to those skilled in the art. Such polysiloxanes can be produced by following a procedure involving hydrolysis of one or more hydrocarbon-substituted dichlorosilanes in which the substituents consist of saturated hydrocarbon groups to produce a crude hydrolyzate containing a mixture of linear and cyclic polysiloxanes. Further, one or more hydrocarbon-substituted dichlorosilanes whose hydrocarbon substituents comprise one or more olefinically unsaturated hydrocarbon groups are hydrolyzed to produce a crude hydrolyzate containing a mixture of linear and cyclic polysiloxanes. The two crude hydrolyzates are depolymerized by being treated with KOH to form mixtures of low boilng, low molecular weight cyclic polymers and undesirable material such as the monofunctional and trifunctional chlorosilane starting material. The resulting compositions are fractionally distilled and there is collected two pure products containing the low boilng, low molecular weight cyclic polymers free of any significant amount of monofunctional and trifunctional groups.

In order to depolymerize the crude hydrolyzates, there is added to them a catalyst and the mixture is heated at a temperature above 150 C. to produce and recover by evaporation a product consisting of low molecular weight cyclic polysiloxanes comprising, for example, about 85 percent of the tetramer and 15 percent of the mixed trimer and pentamer. When the hydrocarbons on the silcon atom are methyl, materials resulting from the presence of monomethyltrichlorosilane in this initial product produced from dimethyldichlorosilane remain as residue in the distillation vessel or tower.

The distillate consisting essentially of low molecular weight cyclic organo polymers, free of any significant amount of monofunctional and trifunctional groups, is collected in a vessel. The then dried cyclic siloxane contains less than 50 p.p.m. of water. The cyclic dimethyl, methylvinyl and diphenyl cyclic siloxanes are prepared in the same way.

The pure cyclic siloxanes are added in the desired proportions in a reaction vessel so as to be subjected to an equilibration reaction to form the polysiloxanes of Formula 1. Thus, about 0.5–17 mole percent cyclic diphenylsiloxane can be added to 82–97.5 mole percent dimethyl cyclic siloxanes. Then, 0.1–1.0 mole percent of methylvinyl cyclic siloxane may be mixed with the dimethyl and diphenyl cyclic siloxane or other desired proportions of the cyclic siloxanes may be used to produce the desired polymer. To the above mixture of pure cyclic siloxanes there is added a polymerization catalyst, such as KOH. The KOH breaks the ring of cyclic siloxanes to form a potassium silanolate which has the formula,

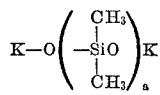

This compound, the potassium silanolate, thus can attack other cyclics to break the rings and increase the chain length of the siloxanes formed. There is further added to the reaction mixture an amount of one or more monofunctional compounds calculated to function as end-blockers for limiting the degree of polymerization and consequently the lengths and molecular weights of the linear polysiloxane chains and for stabilizing the polymers. Usually, a small amount of monofunctional compounds are added to function as end-blockers so as to regulate the chain length of the polymers. Preferably, a compound is used as the chain-stopped groups having the formula,

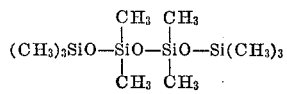

Other monofunctional compounds that may be employed satisfactorily for controlling polymer growth include, among others, hexamethyldisiloxane, tetramethyldiethoxydisiloxane, diethyltetraethoxysiloxane and divinyltetraethoxydisiloxane.

The equilibration reaction is carried out from 2 to 4 huors until about 85% of the cyclic diorganosiloxanes have been converted to polymers end-stopped with monofunctional groups. When the 85% conversion point has been reached, there are just as many polymers being converted to the cyclic siloxanes as there are cyclic siloxanes being converted to the polymer. At that time, there is added to the mixture a sufficient amount of an acid donor, such as phosphorous acid, that will neutralize the KOH catalyst so as to terminate the polymerization reaction. The cyclic diorganosiloxanes in the reaction mixture are then distilled off to leave the polydiorganosiloxane gum which is useful in the present invention.

Alternatively, the mixture of polydiorganosiloxane may be then further reacted with the cyclic siloxanes therein and then during compounding of the mixture with process aid and fillers on a doughmixer, the remaining cyclic siloxanes may be removed by a gas purge.

The polydiorganosiloxane is produced so that it preferably registers a penetration of 50–4,000 mm. per minute on a standard penetrameter. Further, the polymer preferably has a molecular weight in the range of 100,000 to 2,000,000 and a viscosity of 100,000 to 100,000,000 centipoise at 25° C.

Hydrocarbon-substituted polysiloxanes whose pendant groups consist largely of groups other than methyl, such as ethyl or other saturated hydrocarbon groups and olefinically-unsaturated hydrocarbon groups other than, or in addition to, vinyl groups, can be produced by means of procedures similar to that described above or by means of procedures modified in accordance with the known characteristics of the various hydrocarbon groups to be included.

The polydiorganosiloxane gum employed is preferably produced under conditions so controlled as to avoid the incorporation therein of any significant amounts of trifunctional compounds, groups, or molecules to avoid cross-linking of linear polysiloxane chains through silicon and oxygen atoms and the incorporation therein of any significant amount of monofunctional compounds or radicals than those specifically provided to serve as endblockers for limiting the degree of polymerization. Accordingly, the starting polydiorganosiloxane gum contains 2. hydrocarbon groups per silicon atom. Deviations from a ratio of 2 to 1, for example, ratios of 1.95 to 2.01, will be insignificant for all practical purposes since it will attribute to the presence of other hydrocarbon groups whose total numbers will be insignificant as compared with the total number of hydrocarbon groups attached to silicon atoms of linear polysiloxane chains.

In producing the silicone rubber composition of the present invention, there is utilized any of the filler materials of the highly reinforcing types consisting of inorganic compounds or any suitable combination of such filler materials employed in the production of elastomers as is customary in the prior art. There is preferably employed finely divided silica base fillers of the highly reinforcing type which are characterized by a particle diameter of less than 500 millimicrons and by surface areas of greater than 50 square meters per gram. Inorganic filler materials of a composition other than those preferred can be employed alone or in combination with the preferred fillers with good results. Such filler materials such as titanium, iron oxide, aluminum oxide, as well as the inorganic filler materials known as inert fillers which can include among others, diatomaceous earth, calcium carbonate and quartz can preferably be employed in combination with highly-reinforcing silica fillers to improve the tensile strength or the hardness of the elastomeric product. Other examples of suitable fillers are diatomaceous silica, aluminum silicate, zinc oxide, zirconium silicate, barium sulfate, zinc sulfide, aluminum silicate and finely divided silica having surface-bonded alkoxy groups.

There is preferably employed in the present compositions 10–100 percent by weight of said polysiloxane gum of the inorganic filler and preferably 20 to 60 percent by weight.

There is also employed in the present composition 1 to 25 percent and preferably 5 to 15 percent by weight based on the polydiorganosiloxane gum of a process aid for preventing the gum and the filler mixture from structuring prior to curing and after compounding. One example of such a process aid is a compound of the formula

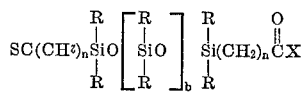

where R is a member selected from the class consisting of methyl and phenyl, X is a member selected from the class consisting of —OH, —NH₂ or —OR', where R' is methyl or ethyl, $n$ has a value of from 2 to 4, inclusive, and $b$ is a whole number equal to from 0 to 10, inclusive. Further details as to the properties, as well as the method of preparation of the compound of Formula 6, are to be found in the disclosure of Martellock U.S. Pat. 3,646,945, which is herein incorporated by reference.

The process aid may also be a dihydrocarbon-substituted polysiloxane oil having hydrocarbon substituent to silicon atom ratio of from 1.6 to 2.0 and whose hydrocarbon substituents comprise at least one member selected from the class consisting of methyl, ethyl, vinyl, allyl, cyclohexenyl and phenyl groups, said polysiloxane oil comprising polysiloxane molecules containing an average of from one to two lower alkoxy groups bonded to each of the terminal silicon atoms where the alkoxy groups are selected from the class consisting of methoxy, ethoxy, propoxy and butoxy.

Preparation of the alkoxy-containing hydrocarbon-substituted polysiloxane oils can be employed as a process aid in the present invention can be carried out by producing one or more types of cyclic dihydrocarbon-substituted polysiloxanes from one or more types of dihydrocarbon-substituted dichlorosilanes and dialkoxysilanes in accordance with the hydrolysis, depolymerization and fractional distillation procedures described in detail above with reference to the preparation of the gum of Formula 1. Then one or more types of cyclic siloxanes so produced are mixed with predetermined amounts of a dihydrocarbon-substituted dialkoxysilane and the mixture is subjected to an equilibrium treatment under controlled conditions to produce the desired alkoxy end-blocked hydrocarbon-substituted linear polysiloxane oil.

The alkoxy-containing hydrocarbon-substituted polysiloxane oils suitable for use in the present invention are relatively low molecular weight polysiloxane oils whose polymer chains have at least four and as much as thirty-five and more dihydrocarbon siloxy units per molecule. The polysiloxane oils preferably have an average of at least one and not more than two alkoxy groups bonded to each of the terminal silicon atoms of the molecule. A more detailed disclosure of the alkoxy end-blocked polysiloxane process aids, as well as their method of preparation, is to be found in the disclosure of Fekete, U.S. Pat. 2,954,357 which is hereby incorporated into this specification by reference.

There may also be used as a process aid hydroxylated organosilanes which contain from one silicon-bonded hydroxyl per 70 silicon atoms to two silicon-bonded hydroxyls per silicon atom and contains from 1.9 to 2.1 hydrocarbon radicals per silicon atom. The remaining valences of the silicon atom are satisfied by oxygen atoms. The hydroxylated materials include both monomers such as diphenylsilanediol and polymeric materials which contain two silicon-bonded OH groups in the molecule. In addition, the hydroxylated organosilane may be a mixture of hydroxyl-containing siloxanes and completely condensed siloxanes. Irrespective of the particular composition of the hydroxylated organosiloxane, it is necessary that there be present in said organosilane from one OH to 70 silicon atoms to two OH per silicon atom.

The hydroxylated siloxanes may be prepared by any suitable method, such as heating said siloxanes with steam under pressure at temperatures of about 120° C. or hydrolyzing silanes of the formula $R_nSiX_{4-n}$ where X is any hydrolyzable group such as Cl, OR, H, —OOR and R is a monovalent hydrocarbon radical. The former method is preferred for the preparation of those hydroxylated materials in which the hydrocarbon radicals are alkyl, while the latter method is best for the siloxanes in which hydrocarbon radicals are monocyclic aryl hydrocarbon radicals. Further, detailed information as to the hydroxylated organosiloxanes which may be used as process aids is to be found in Konkle et al. U.S. Pat. 2,890,188, the disclosure of which is being incorporated into this application by reference.

Any of the above process aids may be used alone or mixtures thereof may be used in the above-defined concentrations. Further, other suitable process aids may also be used in the silicone rubber compositions of the present invention.

The curing of the silicone rubber composition of the present invention can be effected by chemical vulcanizing agents or by high energy electron radiation. More often, chemical vulcanizing agents are employed for the curing operation and any of the conventional curing agents can be employed. The preferred curing agents are organic peroxides conventionally used to cure silicone elastomers. Especially suitable are the dimethyl peroxides which may have the structural formulas,

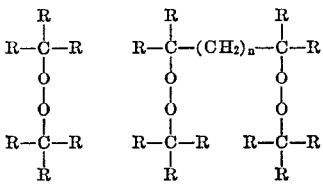

wherein R represents the same alkyl group throughout or alkyl groups of two or more different types and $n$ is zero or a larger integer.

Among the specific peroxide curing catalysts that are preferred are di-tertiary-butyl peroxide, tertiary-butyl-triethylmethyl peroxide, tertiary-butyl-tertiary-butyl-tertiary-triphenyl peroxide, t-butyl perbenzoate and a di-tertiary alkyl peroxide such as dicumyl peroxide. Other suitable peroxide catalysts which effect curing through saturated as well as unsaturated hydrocarbon groups on the silicon chain are aryl peroxides which include benzoyl peroxides, mixed alkyl-aryl peroxides which include tertiary-butyl perbenzoate, chloroalkyl peroxides such as 1,4-dichlorobenzoyl peroxide; 2,4-dichlorobenzoyl peroxide, monochlorobenzoyl peroxide, benzoyl peroxide, etc. Generally 0.1–8 percent of said peroxide by weight of the polydiorganosiloxane gum is used to cure the silicone rubber composition and preferably 0.5–3.0 percent by weight of the above curing catalyst, t-butyl perbenzoate, is preferred.

To obtain the compounds of Formulas 2 and 3, benzene is reacted at a temperature of 250° C. to 400° C. and preferably above 300° C. in the presence of air in a vapor phase reaction to produce maleic anhydride. In this reaction, vanadium pentoxide is a necessary catalyst. The reaction takes place without a solvent to produce the desired maleic anhydride, as well as carbon dioxide and water. The maleic anhydride can then be reacted with an unsaturated alcohol at room temperature to produce the half acid ester of maleic acid. The resulting half ester can then be reacted with another mole of an unsaturated alcohol, such as allyl alcohol, in the presence of a strong acid such as toluene sulfonic acid, and a solvent to produce the diunsaturated hydrocarbon substituted maleate. Any type of unsaturated alcohol may be used in the above reactions.

The above method results in di-unsaturated hydrocarbon maleates. In order to obtain the isomeric fumarates, the maleate is equilibrated at a temperature of 75° C. to 400° C. in the presence of hydrogen chloride gas. As a result of the reaction, there is obtained a mixture of the cis- and trans-isomers which can be separated by fractionation. When the second mole of unsaturated alcohol is reacted with mono-unsaturated hydrocarbon-substituted maleic acid, a solvent is preferably used such as a solvent selected from commonly inert solvents, such as toluene, xylene, mineral spirits, benzenes and other types of solvents.

To obtain the maleates and fumarates of Formulas 2 and 3, where Z is equal to CONH or $CONR^2$, maleic anhydride as produced in accordance with the above process is once more used as a starting material. The maleic anhydride is first reacted with an unsaturated hydrocarbon amine which may be a primary amine or a secondary amine, such as allylamine, to obtain the mono-substituted N-allyl maleamic acid. This reaction is preferably carried out without any solvent and at room temperature. The maleamic acid reaction product is then taken and placed in an inert solvent such as benzene and refluxed at 60° C. to 80° C. so that it may react while it is refluxing with sulfonyl chloride. The resulting maleamoyl chloride product may then be reacted with a second mole of allylamine so as to obtain the diallyl-maleamide. This second reaction is preferably carried out without any solvent and in the temperature range of 0° C. to 50° C. in order for the reaction to proceed to completion. In place of the allylamine as exemplified above, there may be used any other type of unsaturated hydrocarbon amine although allylamine is the preferred reactant. Further, in place of the primary unsaturated hydrocarbon amine, there may be used a secondary unsaturated hydrocarbon amine to obtain a product coming within the scope of Formulas 2 and 3, where Z is equal to $CONR^2$.

In order to obtain a compound within the scope of Formulas 2 and 3, wherein Z is equal to a phenylene group, it is desirable to utilize a Wittig reagent which Wittig reagent is discussed in detail in "Organic Reactions," vol. 14, chap. J, published by John Wiley & Sons in 1965. Thus, using such a Wittig reagent, one type of maleate that can be produced in which Z is equal to phenylene groups and $R^5$ is equivalent to a vinyl group, is obtained by reacting two compounds of the formula,

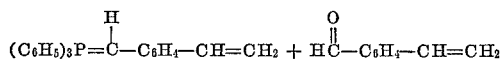

to obtain the desired diphenylmaleate. A similar type of reaction can be carried out where it is desired that the unsaturated hydrocarbon group be other than vinyl. This reaction is preferably carried out in solvents such as tetrahydrofuran or other solvents, such as 1,2-dimethoxyethane, and the Glymy solvents produced by the Ansul Chemical Co. Further, in order for the reaction to proceed as desired to obtain the reaction product set forth in the above reactions, it is necessary to carry out the reaction at a temperature range of −40° C. to −20° C. To obtain a compound of Formulas 2 and 3, where Z is equal to a carbonyl, CO, a Grignard type of reaction is used. This type of reaction is set forth in detail in the publication "Organic Synthesis," vol. 3, p. 109, published by John Wiley & Sons (1965) and "Organic Reactions," vol. H by D. A. Shirley, published by John Wiley & Sons (1964).

In the case where $R^5$ is desired to be allyl and G' is also desired to be an unsaturated hydrocarbon, such as allyl, the reactants for producing the desired diketone product are as follows.

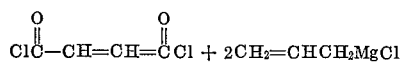

In this reaction, a solvent is used such as exemplified before with the Wittig reagents, such solvents being exemplified by tetrahydrofuran and ether solvents, such as 1,2-dimethoxyethane. Further, in order to obtain the desired product, it is necessary to cool the reaction temperatures so as to maintain it in the range of −60° C. to −80° C. The above reaction can be carried out with any other Grignard reactant where $R^5$ is equal to unsaturated hydrocarbon other than allyl. If one mole of the allyl Grignard reagent is reacted with one mole of the fumaryl chloride reactant, there will be obtained an allyl-substituted group for one of the chlorine atoms, with the other chlorine atom terminal group being left unreacted. These resulting products can then be hydrolyzed so as to change the acid chloride group to an acid group as desired.

The reactants in the above reactions for obtaining the compounds of Formulas 2 and 3, where Z is equal to CONH, $CONR^2$, phenylene and CO, are well known compounds whose synthesis can be found in any advanced work in organic chemistry. However, for further details as to the manner of preparation of these compounds, as well as the reactions exemplified above, one is referred to the references disclosed herein before. The fumaryl chloride which is in the last reaction set forth above, is obtained by reacting maleic anhydride with phthaloyl chloride in the presence of a zinc chloride as a catalyst. The reaction is allowed to proceed at room temperature in the range of 100° C. to 150° C. for 2 hours. The resulting fumaryl chloride is obtained as the desired reaction product. This reaction is more fully described in "Organic Synthesis," vol. 3, pp. 222, published by John Wiley & Sons (1955), and the reader is referred to that reference for a fuller description of this reaction, as well as the other references specified above.

The silyl compounds of Formulas 4 and 5 are obtained by reacting the compounds of Formulas 2 and 3 with a hydrosilane of the formula, (7) 

in the presence of a platinum catalyst, where $R^2$ is as defined previously, X is halogen and preferably chlorine, and $n$ is a whole number that varies from 1 to 3, as defined previously. If G' in Formulas 2 and 3 is the same as the $R^5$ radical, that is, it is a monovalent unsaturated hydrocarbon radical, the hydrosilane of Formula 6 may be added on to both of the unsaturated linkages in the $R^5$ radicals by reacting two moles of this hydrosilane of Formula 7 with one mole of the compounds of formulas 2 and 3. However, even if G' is equal to an $R^5$ radical, such as an allyl radical, mono-addition can be carried out by controlling the stoichiometry, that is by reacting one mole of the hydrosilane of Formula 7 with one mole of the compounds of Formulas 2 and 3. If di-substitution is desired, on the other hand, two moles of the hydrosilane of Formula 7 is reacted with one mole of either the maleates and/or fumarates of Formulas 2 and 3 and a di-addition product will be obtained.

The reaction is preferably carried out at room temperature and a solvent is not required. In that case, any inert solvent such as toluene, xylene, mineral spirits, benzene, etc., can be used. Suitable catalysts for the addition of the silane of Formula 6 to the compounds of Formulas 2 and 3 are the various platinum and platinum compound catalysts known in the art. These catalysts include elemental platinum in the finely divided state which can be deposited on charcoal or aluminum, as well as the various platinum compounds such as chloroplatinic acid, a platinum hydrocarbon complex of the type shown in U.S. Pats. 3,159,601, 3,159,602, as well as the platinum alcoholic complexes prepared from the chloroplatinic acids which are described and claimed in Lamoreaux U.S. 3,220,972. Preferably, the platinum catalyst is added to the hydrosilane located in the reaction chamber to which is also added the solvent, and then the unsaturated maleate or fumarate is slowly added to the reaction mixture at the reaction temperatures described above. When elemental platinum or one of the platinum complex catalysts is used, the catalyst is generally used in an amount sufficient to provide about $10^{-4}$ to $10^{-6}$ moles of platinum per mole of reactants. The reaction is allowed to proceed to completion in 4 to 15 hours and preferably in 5 to 8 hours. After the reaction period is over, a sample of the reaction mixture may be checked by infrared analysis for SiH bonds to determine how far the reaction has proceeded to completion. When at least 95% of the SiH silane has been converted to the reaction product, the reaction mixture may be cooled and the reaction may be considered to have proceeded to a sufficient extent for the conversion to the silyl compounds. After the silylmaleate, whether the mono-substituted or di-substituted product is obtained, there is still halogen atoms attached to the silicon atoms which have to be substituted, otherwise the resulting compound is hydrolyically unstable.

To replace these chlorine atoms, the halosilyl may be reacted with an alcohol or an acid of the formula $R^3OH$, $R^3COOH$, where $R^3$ is as defined previously and is preferably a saturated monovalent hydrocarbon radical, such as alkyl, with no more than 8 carbon atoms. In preparing the reaction mixture, one mole of the halosilylmaleate is reacted with 3-$n$ moles of the alcohol or acid, that is, the number of moles of the alcohol or acid must be equivalent to the number of moles of the halogen attached to the silicon atoms, and the reaction is allowed to proceed at reduced pressures and moderate temperatures when it is, carried out in the absence of a solvent. The reduced pressures and moderate temperatures are peferred so that the acid that is formed from the alkoxylation or acylation would be boiled off and will not contaminate the desired product. Thus, it is preferred that the reaction be carried out at less than 100 mm. of mercury pressure at temperatures in the range of 75° C. to 100° C.

As an alternative, the alkoxylation or acylation reaction may be carried out in the presence of a hydocarbon solvent, in which solvent the hydrogen chloride that was released is not soluble so that during the course of the reaction, the acid which is given off does not affect the silylmaleate or silylfumarate product which is within the scope of Formulas 4 and 5. As an alternative, both the maleates and the fumarates of Formulas 2 and 3 may be reacted with a hydroalkoxysilane in place of the hydrohalosilane of Formula 6. However, with the alkoxysilane, the SiH-olefin addition in the presence of a platinum catalyst proceeds more slowly than in the case where the silane of Formula 6 is used.

In accordance with an additional embodiment of the present invention, there is within the scope of the present invention polysiloxane compounds of the formulas, (8) 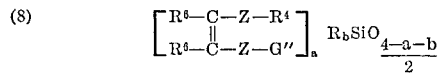

and polysiloxane compounds of the formula, (9) 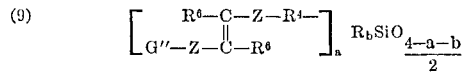

wherein Z, R, $R^4$ and $R^6$ are as defined previously and $G''$ is selected from hydrogen, where $R'$ is as defined previously, and the radical,

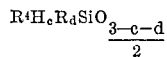

in which $a$ varies from 0.005 to 2.0 and $b$ varies from 1.0 to 2.5, the sum of $a$ plus $b$ is equal to 1.005 to 3.0, inclusive. Further, in the above formulas $c$ varies from 0 to 1.0, $d$ varies from 1.0 to 2.5, and the sum of $c$ plus $d$ varies from 1.0 to 2.5. To obtain the polysiloxane maleates and fumarates of Formulas 8 and 9, the unsaturated hydrocarbon maleates and fumarates of Formulas 2 and 3 are reacted with a hydrogen polysiloxane of the formula,

(10) 

in the presence of a platinum catalyst, where R, $a$ and $b$ are as previously defined. The reaction conditions, as well as the type of platinum catalyst that may be used and the concentration of the platinum catalyst is the same as that previously set forth in describing the recations between the maleates and fumarates of Formulas 2 and 3 and the hydrohalosilane of Formula 6.

Methods for making the silicon hydride of Formula 7 are well known as shown in "Organsilicon Compounds" by Eaborn, p. 24 (1960), Butterworth Scientific Publications. The hydrogenpolysiloxane of Formula 10 is also a well known compound in the art. The hydrogenpolysiloxane may be obtained by hydrolyzing hydrogenorganochlorosilanes with diorganodichlorosilanes in the presence of water. As a result, there is obtained a mixture of cyclic and linear siloxanes. The cyclic polysiloxanes that are formed are boiled off and collected. The different diorgano cyclic and organohydrogen cyclic polysiloxanes are then mixed together and equilibrated in the presence of a polymerization catalyst, such as potassium hydroxide, to form the hydropolysiloxane of Formula 10. In the equilibration procedure there is also added as a reactant a chain-stopper such as hexamethyldisiloxane of dihydrogentetramethyldisiloxane so as to provide the appropriate chain-stoppers to the polysiloxane polymers that are formed. The type of chain-stopper that is use determines the identity of the terminal group on the polymer chain. Further, the amount of the chain-stopper that is used relative to the cyclic polysiloxanes determines the length of the polymer chains that are formed. As far as the equilibration procedure and reaction conditions, this is much the same as that used to form the polysiloxane of Formula 1 and one is referred to that description above for more detailed description of the procedure.

In order to obtain the polysiloxane of Formulas 8 and 9, where $G''$ is equal to a polysiloxane radical, one mole of the maleates or fumarates of Formulas 2 and 3, separately or together, is reacted with one mole of the hydrogenpolysiloxane of Formula 10. The resulting compound will be a maleate or fumarate having an $R^5$ radical thereon and having a G radical thereon which is equal to the polysiloxane. That is, the majority of the product formed will contain an $R^5$ terminal group and a polysiloxane terminal group. This reaction, of course, is carried out in the presence of a platinum catalyst. Then the resulting product is separated as is normal in an SiH-olefin addition reaction and the product is again reacted with a hydropolysiloxane of Formula 10 in the presence of a platinum catalyst. In this case, one mole of the polysiloxane maleate or fumarate product is reacted with one or more moles of the hydrogenpolysiloxane of Formula 10. The final product that is obtained from this second reaction of the hydrogenpolysiloxane of Formula 10 with a polysiloxane maleate or fumarate is a polysiloxane within the scope of Formulas 8 and 9 above.

In all the above synthetic reactions which were described in detail, $R^6$ was exemplified by hydrogen. However, it can be appreciated that $R^6$ can be any alkyl radical of up to 10 carbon atoms, such as methyl, ethyl, etc.

The self-bonding additives which are added to the composition of the present case are utilized in the composition in amounts of 0.25 to 10% by weight of the composition. Less than 0.25 weight percent does not render the resulting composition self-bonding. In excess of 10% by weight of the additives does not increase the self-bonding properties of the cured polysiloxane but, in addition, tends to degrade the properties of the rubber. Preferably, the self-bonding additives are used in the composition in the range of 1.0 to 4.0% by weight. It should be mentioned that the above percentages are based on a composition which only includes the organopolysiloxane, a curing catalyst and the self-bonding additive.

For a fuller description as to the process by weight the self-bonding additives in the present case are synthetized, one is referred to the disclosure of the patent application of Terry G. Selin and Abe Berger, Serial No. 144,306, filed May 17, 1971, which is copending with the present case.

In addition to the fillers, process aid, curing catalyst and the maleates, the organopolysiloxane composition of the present invention can also contain structure control additives, pigments, heat stabilizers, etc. Examples of heat stabilizers are iron oxide, arylurethanes, etc., which can be employed in proportions up to 5 parts per 100 parts of the organopolysiloxane polymer of Formula 1. In the practice of the invention, the organopolysiloxane composition is produced by forming a mixture of the organopolysiloxane polymer, filler, process aid and maleate material, a structure control additive and a heat stabilizer. The order of addition of the various ingredients is not critical. For example, the various ingredients or mixtures can be blended together by use of standard rubber mixing equipment, such as a doughmixer, rubber mill, Waring Blendor and the like. One procedure, for example, is to add the filler to the polymer while it is being milled, followed by the addition of the maleate, heat stabilizers, plasticizers, curing catalysts, etc.

Another procedure which can be employed is to doughmix the polymer and filler and add the maleate material, curing catalyst, etc., to the polymer filler blend while it is milled in the rubber mill. Those skilled in the art would know, depending upon the properties desired in the final cured product and applications to which the cured product is to be employed, the nature and amount of the particular ingredients utilized and the manner of blending to produce the desired organopolysiloxane compositions. The organopolysiloxane composition can be converted to the solid, elastomeric state at temperatures in the range of from 80° C. to 650° C., depending upon the nature of the curing catalyst, duration of the cure, amount and type of filler, etc. The direct conversion of the organopolysiloxane composition to the cured, solid, elastic state can be effected as a result of the of the extrusion and calendering operations. For example, depending upon the curing catalyst used, a temperature of 80° C. to 300° C. can be employed for compression and transfer molding for either 30 minutes or more, or a minute or less. Hot air vulcanization temperatures from 150° C. to 650° C. or steam vulcanization at temperatures between 110° to 210° C. can be employed for periods of from 5 to 10 minutes or a matter of seconds during extrusion operation, again depending upon the curing catalyst used.

Those skilled in the art would know, in view of the application for which the cured product is intended, the particular means to be utilized in any particular situation. If desired, the cured product of the present invention can be oven-cured following the fabrication treatment after it has achieved optimum properties without adverse effects. Irrespective of the type of curing used, the organopolysiloxane mixed with filler, process aid, curing catalyst and maleate can be applied directly on the substrate with which the laminate is formed.

The heat-curable polysiloxane composition of the present case will self-bond to various synthetic fiber substrates, such as dacron, nylon, heat-resistant nylon, glass cloth, rayon, cotton, wool, acetate fibers, acrylate fibers, teflon and polyester fibers. It will also self-bond with good adhesion so as to produce cohesive rupture upon being tested with natural fibers, such as wool and cotton. Further, this self-bonding composition of the present case will bond to plastic substrates, such as polycarbonates, polyvinyl chloride plastics, polyethylene plastics, polypropylene plastics, polyester plastics, polyamide plastics, teflon plastic and other types of plastics.

Other substrates to which the heat-curable silicone rubber composition will bond which results in cohesive failure upon being tested is stell substrates, aluminum substrates, glass substrates, concrete and wood.

In the above procedure for mixing and curing the organopolysiloxane composition, there was mentioned many different types of methods. Particularly, it is preferred that the different ingredients, such as the organopolysiloxane polymer, the silica filler, the process aid and the maleate additive, the curing catalyst and the other ingredients be mixed in a doughmixer and then be placed on a calender. Then the mixture can be calendered onto a substrate, and particularly a synthetic fiber substrate. Of course, the silicone rubber composition of the present case cannot be milled onto a brittle substrate or a hard substrate such as glass or steel. However, with synthetic fiber or soft plastic substrates that are flexible, the silicone rubber composition of the present case is preferably milled or calendered onto the substrate and then press-cured from 1 minute to 2 hours at a temperature in the range of 150° C. to 250° C. or at a temperature in the range of 200° F. to 400° F. In the case where the substrate is brittle or hard and unflexible so that it cannot be milled or calendered together with the silicone rubber composition of the present case, then the silicone rubber composition is preferably milled in the form of a sheet and the sheet is applied to the substrate and press-cured.

As pointed out previously, the maleate additives of Formulas 2–5 are added and milled or doughmixed into the organopolysiloxane polymer, filler, process aid and curing catalyst mixture. The resulting composition may then be used immediately so as to bond and cure on the substrate, or it may be placed and stored for a period of time. A silicone rubber composition of the present case containing the maleate of Formulas 2 and 3 can be stored indefinitely without any adverse effects to the self-bonding properties of the composition when it is finally applied to substrates and cured.

Another method in which the silicone composition of the present case can be applied to various fibers is by the dip coating method. That is, the composition of the present case as defined above is dissolved in a solvent such as xylene, so as to obtain 15 to 40% solids solution and then the fibers or other elongated pieces of fabrics or other type of substrate is dipped into the solution, taken out of the solution and heated within a period of one minute to 30 minutes at a temperature within the range of 300° C. to 400° C. to evaporate the solvent and cure the composition of the present case on to the fabric substrate. If desired, the fabric having the coating of self-bonding, heat-cured silicone composition of the present case can be redipped as many times as desired into the solution to obtain successive layers of silicone rubber covering the fabric in order to obtain the desired thickness of silicone rubber on the fabric. As pointed out previously, and will be indicated below, the compositions of the present case were prepared and cured on various substrates to determine whether there would be cohesive or adhesive failure. In the tests indicated in the examples below, a Tinius Olsen tester which reads in pounds per inch of pull is used. The procedure in carrying out the test with the machine was to mix the organopolysiloxane polymer with a process aid, filler, maleate additive and curing catalyst in a doughmixer and then take the resulting mixture and mill it so as to obtain two sheets of substantially the same thickness on two sections of the same substrate. The two sections of the same type of substrate were brought then together so that the silicone rubber sheets touched one another. The resulting laminate was placed in a mold and cured for a period of time from one minute to 60 minutes in the temperature ranges indicated above. Before the laminate was cured, there was placed in one part of the laminate a spacer between the two sheets of silicone rubber. After the laminate had been cured, the spacer was removed and the substrates and silicone rubber were cut along the sides in the area of the spacer so that two strips were formed from the laminate which could be put on the Tinius Olsen tester. The tester was then started and the pull was measured until there was adhesive or cohesive failure. In order that those who are skilled in the art will be able to understand the practice of the present invention, the following examples are given by way of illustration and not by way of limitation. All parts are by weight.

EXAMPLE 1

A polydimethylsiloxane gum having the formula,

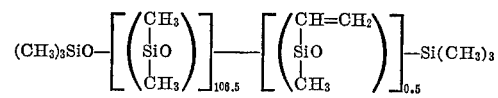

is mixed with 15 parts of an alkoxy-stopped dimethyldiphenylsiloxane process aid. To this mixture there is added 80 parts of fumed silica and the mixture is thoroughly mixed in a doughmixer. After the mixture is thoroughly mixed in the doughmixer, it is placed on the mill and there is milled into it per 100 parts of the mixture, 0.25 part of t-butyl perbenzoate as a curing catalyst, which composition is hereinafter referred to as Composition A. To different samples of Composition A there is added the self-bonding additives enumerated in Table I. The silicone rubber sheets that are formed are placed on a sheet of nylon fiber. These sheets are press-cured for a period of 60 seconds at a temperature of 300° C. At the end of that time, the sheets are subjected to the Tinius Olsen test specified above. From the initial samples of Composition A mixed with the various additives there also are taken further samples which are aged 7 days, 14 days and 6 months.

These further samples which are then applied to sheets of nylon fiber and press-cured for the same length of time and at the same temperature as the unaged samples, are then subjected to the Tinius Olsen test. The bond strength as determined by the Tinius Olsen test discussed above using the various self-bonding additives at various concentrations and at various self-aging times is given in Table I below.

measured in pounds per square inch as distinguished from the previous tests of Example 1 which measures the force necessary to separate the silicone rubber layer from the substrate in pounds per inch. There is also prepared a sample sheet in which no self-bonding additive was used. Further, the glass silicone rubber layer laminate cannot be placed on a testing machine because of the brittleness of the glass. However, by merely pulling of the silicone TABLE I.—BOND STRENGTHS AND SHELF STABILITY
Bond Strengths in lbs./in.

| Self-bonding additives | Phr. | 0 days | 8 days | 14 days | 6 mos. | Percent retention |
|---|---|---|---|---|---|---|
| Diallylmaleate | 1.2 | 45-62 | 49-65 | 49-60 | 47-60 | 100 |
| Diallylfumarate | 1.0 | 43-55 | 45-60 | 49-63 | 45-55 | 100 |
| Allyl acid maleate | 1.1 | 42-48 | 47-60 | 50-60 | 47-58 | 100 |
| Bis-(3-chloropropenyl) maleate | 0.8 | 38-40 | 40-55 | 44-58 | 50-50 | 100 |
| Ethyl allyl fumarate | 1.25 | 47-55 | 53-60 | 53-63 | 50-60 | 100 |
| Diisopropenyl fumarate | 2.00 | 60-70 | 65-75 | 67-75 | 59-70 | 100 |

The above results indicate that the various selfbonding additives enumerated in Table I give very good adhesion to undyed, unprimed nylon fiber which is, in fact, much better than that using primers on the nylon and then applying on top of the primer layer the heat-curable silicone rubber material. Further, the above self-bonding additives enumerated in Table I are shown to have superior self-aging properties such that even after a six month period, the gum, filler, process aid, curing agent and self-bonding additive mixture has the same self-bonding capabilities as it did on the day that the mixture was prepared.

EXAMPLE 2

There is prepared a mixture of the polysiloxane gum of Example 1 with 20 parts of the process aid of Example 1 and 40 parts of silica fillers. These compounds are mixed in the doughmixer until there is obtained a uniform mixture which is referred to as Composition B. Different samples of Composition B are taken and samples are placed on a mill and there are milled into the samples 0.25 part of dicumyl peroxide per 100 parts of the samples. There is also milled into the samples different amounts of the self-bonding additives enumerated in Table II below per 100 parts of Conposition B. The resulting sheets are placed on the various substrates set forth in Table II below such as stainless steel, bare aluminum, alclad aluminum, cold rolled steel, glass and the resulting laminates are either press-cured in a press for 30 seconds at 400° F. or rubber layer from the glass substrate, it is possible to determine whether the failure is cohesive or adhesive. The results of the tests are indicated in Table II below. In this Table II, after the pounds per square inch of pull necessary to cause failure of the laminate, there is indicated by a C where the failure is cohesive or by an A where the failure is indicated to be adhesive.

As indicated by Table II, with the self-bonding additives of the present invention incorporated into silicone rubber Composition B, there is obtained a laminate which is at least twice as strong as the laminate obtained without the use of the self-bonding additives. Further, without the self-bonding additives in all cases, the failure was adhesive, while with the self-bonding additives of the present invention in all cases the failure of the laminate was cohesive.

In addition to 100 parts of Composition B. there is milled 1.25 parts of diallylmaleate and 0.5 part of t-butyl perbenzoate. The mixture that is formed is calendered on a 2.0 mil strip of etched Teflon and press-cured for 20 minutes at 300° F. A similar mixture of Composition B without a maleate of the present case and with 0.5 part of t-butyl perbenzoate is calendered on a 2.0 mil thick strip of Teflon and press-cured for 20-minutes at 300° F. The laminate that is formed having no self-bonding additive permitted the etch Teflon to be peeled off easily from the silicone rubber layer. In the case where the laminate contained the silicone rubber composition with diallylmaleate therein, the etched Teflon layer cannot be peeled off the silicone rubber layer.

TABLE II
Bond strength for Different Types of Substrates in p.s.i.

| Self-bonding additive | Cure | Phr. | Stainless steel | Bare aluminum | Alclad aluminum | Cold rolled steel | Glass |
|---|---|---|---|---|---|---|---|
| Bis-trimethoxysilylpropyl maleate | Press | 1.25 | 580/C | 410/C | 500/C | 750/C | C |
| Bis-trimethoxysilylpropyl fumarate | do | 1.45 | 600/C | 450/C | 550/C | 780/C | C |
| Bis-dimethoxymethylsilylpropyl maleate | do | 1.00 | 570/C | 350/C | 520/C | 760/C | C |
| Trimethoxysilylpropylallyl fumarate | do | 0.85 | 600/C | 480/C | 520/C | 800/C | C |
| Bis-ethoxydimethylsilylpropyl maleate | do | 1.50 | 730/C | 525/C | 575/C | 860/C | |
| None | do | | 186/A | 30/A | 0/C | 193/A | A |
| | 1 hr./700° F | 2.00 | 800/C | 310/C | 790/C | 891/C | C |

$$\left[ \begin{array}{c} CH_3 \\ | \\ -Si-CH_2CH_2CH_2O-C-C \\ | \\ CH_3 \end{array} \begin{array}{c} O \;\; O \\ \| \;\; \| \\ \\ \| = \| \\ H \;\; H \end{array} \longrightarrow \begin{array}{c} CH_3 \\ | \\ OCH_2CH_2CH_2SiO \\ | \\ CH_3 \end{array} \right]_x$$

cured in an air oven at 300° C. The cured laminates are then subjected to a shear test comprising taking one square inch of the sheets prepared as stated above and placing them on a one inch wide strip of substrate. Then a one inch wide strip of substrate is placed above the silicone rubber sheet and the resulting laminate is cured. The cured laminate comprising a layer of substrate, a layer of silicone rubber and a layer of substrate is then placed in a testing machine which pulls the substrates apart and the resulting force required to separate the substrates is

We claim:
1. A self-bonding, heat-curable silicone rubber composition comprising,
(a) from 82% to 99.65% by weight of an organopolysiloxane polymer having a viscosity of at least 100,000 centipoise at 25° C. of the formula,

$$(R)_aSiO_{\frac{4-a}{2}}$$

(b) from 0.1 to 8% by weight of a curing catalyst, and (c) from 0.25 to 10% by weight of a self-bonding additive selected from the group consisting of the formula,

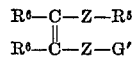

and of the formula,

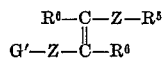

where R is selected from monovalent hydrocarbon radicals and halogenated monovalent hydrocarbon radicals, $R^6$ is selected from alkyl radicals and hydrogen, Z is selected from

phenylene, CO,

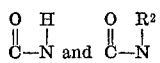

$R^2$ is selected from the same radicals as R, $R^5$ is selected from unsaturated monovalent hydrocarbon radicals and unsaturated halogenated monovalent hydrocarbon radicals, G' is selected from hydrogen, R radicals and $R^5$ radicals and $a$ varies from 1.95 to 2.01, inclusive.

2. The composition of claim 1 wherein there is added to the polysiloxane a process aid selected from the class consisting of a dihydrocarbon-substituted oil and a hydroxylated organosiloxane which comprises 1 to 25% by weight of said organopolysiloxane.

3. The composition of claim 2 wherein the process aid is a dihydrocarbon-substituted polysiloxane oil having a hydrocarbon substituent to silicon atom ratio of from 1.0 to 2.0 and where said hydrocarbon substituents comprise at least one member selected from the class consisting of methyl, ethyl, vinyl, allyl, cyclohexenyl and phenyl groups, said polysiloxane oil comprising polysiloxane molecules containing an average of from one to two lower alkoxy groups bonded to each of the terminal silicon atoms.

4. The composition of claim 1 further including a silica filler which comprises 20% to 60% by weight of the organopolysiloxane.

5. The composition of claim 1 wherein at least 50% of the R radicals are methyl, $R^6$ is hydrogen, and G' is the same as the $R^5$ radicals.

6. The composition of claim 1 wherein the curing catalyst is t-bultyl perbenzoate.

7. The composition of claim 1 wherein the self-bonding additive is diallylmaleate.

8. A self-bonding, heat-curable silicone rubber composition comprising,
(a) from 82% to 99.65% by weight of an organopolysiloxane polymer having a viscosity of at least 100,000 centipoise at 25° C. of the formula,

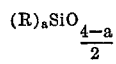

(b) from 0.1 to 8% by weight of a curing catalyst, and
(c) from 0.25 to 10% by weight of a self-bonding additive selected from the group consisting of the formula,

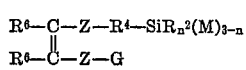

and

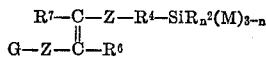

where Z is selected from

phenylene, CO,

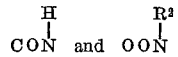

G is selected from hydrogen, R', and $F^4SiR^2_n(M)_{3-n}$, M is selected from $R^3O$ and $R^3COO$, where R, $R^2$ and $R^3$ are selected from monovalent hydrocarbon radials and halogenated monovalent hydrocarbon radicals, $R^6$ is selected from alkyl radicals and hydrogen, $R^4$ is selected from divalent hydrocarbon radicals and halogenated divalent hydrocarbon radicals, R' is selected from monovalent hydrocarbon radicals and halogenated monovalent hydrocarbon radicals, $a$ varies from 1.95 to 2.01, inclusive, and $n$ is a whole number that varies from 1 to 3.

9. The composition of claim 8 wherein there is added to the polysiloxane a process aid selected from the class consisting of a dihydrocarbon-substituted oil and a hydroxylated organosiloxane which comprises 1 to 25% by weight of said organopolysiloxane.

10. The composition of claim 8 further including a silica filler which comprises 20% to 60% by weight of the organopolysiloxane.

11. The composition of claim 8 wherein the curing catalyst is t-butyl perbenzoate.

12. The composition of claim 1 wherein $R^6$ is hydrogen, G is an R' radical which is an unsaturated hydrocarbon radical selected from the group consisting of alkenyl and arylene radicals.

13. The composition of claim 8 wherein Z is COO and G is $R^4siR^2_n(M)_{3-n}$.

14. The composition of claim 8 wherein $R^4$ is propylene, M is $R^3O$ and $R^2$, and $R^3$ is methyl.

15. The composition of claim 8 wherein the silylmaleate is trimethoxysilylpropylallylmaleate.

16. A self-bonding, heat-curable silicone rubber composition comprising,
(a) from 82 to 99.65% by weight of an organopolysiloxane polymer having a viscosity of at least 100,000 centipoise at 25° C. for the formula,

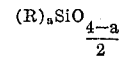

(b) from 0.1 to 8% by weight of a curing catalyst, and
(c) from 0.25 to 10% by weight of a polysiloxane additive selected from the group consisting of the formula,

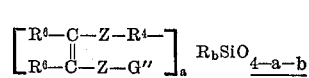

and of the formula,

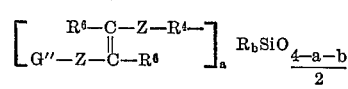

where Z is selected from COO, phenylene, CO, CONH, $CONR^2$, G" is selected from hydrogen, $R^1$ and

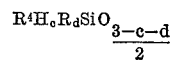

where R, R² and R' are selected from monovalent hydrocarbon radicals and halogenated monovalent hydrocarbon radicals, R⁴ is selected from divalent hydrocarbon radicals and halogenated divalent hydrocarbon radicals, R⁶ is selected from hydrogen and alkyl radicals of up to 10 carbon atoms, $a$ varies from 0.005 to 2.0, $b$ varies from 1.0 t 2.5, the sum of $a$ plus $b$ varies from 1.005 to 3.0, $c$ varies from 0 to 1.0, $d$ varies from 1.0 to 2.5 and the sum of $c$ plus $d$ varis from 1.0 to 2.5.

References Cited

UNITED STATES PATENTS 3,070,567  12/1962  Nitzsche et al. ____ 260—37 S B
3,231,542  1/1966  Eisinger et al. ____ 260—46.5 G LEWIS T. JACOBS, Primary Examiner U.S. Cl. X.R.

260—37 SB, 46.5 G